United States Patent
Maehara et al.

(10) Patent No.: US 11,254,821 B2
(45) Date of Patent: Feb. 22, 2022

(54) SILICONE OIL-TREATED FUMED SILICA, MANUFACTURING METHOD AND APPLICATION THEREOF

(71) Applicant: TOKUYAMA CORPORATION, Shunan (JP)

(72) Inventors: Takayuki Maehara, Jiaxing (CN); Qingtao Zhou, Jiaxing (CN); Jianzhang Dai, Jiaxing (CN)

(73) Assignee: TOKUYAMA CORPORATION

( * ) Notice: Subject to any disclaimer, the term of this patent is extended or adjusted under 35 U.S.C. 154(b) by 294 days.

(21) Appl. No.: 16/495,191

(22) PCT Filed: Mar. 27, 2018

(86) PCT No.: PCT/CN2018/080614
§ 371 (c)(1),
(2) Date: Sep. 18, 2019

(87) PCT Pub. No.: WO2018/184486
PCT Pub. Date: Oct. 11, 2018

(65) Prior Publication Data
US 2021/0115262 A1    Apr. 22, 2021

(30) Foreign Application Priority Data

Apr. 7, 2017   (CN) .......................... 201710222187.3

(51) Int. Cl.
| | |
|---|---|
| B32B 5/16 | (2006.01) |
| B05D 7/00 | (2006.01) |
| C09C 1/30 | (2006.01) |
| C08G 59/40 | (2006.01) |
| C08G 59/50 | (2006.01) |
| C09J 11/06 | (2006.01) |
| C09J 163/00 | (2006.01) |

(52) U.S. Cl.
CPC ........ *C09C 1/3081* (2013.01); *C08G 59/4085* (2013.01); *C08G 59/504* (2013.01); *C09J 11/06* (2013.01); *C09J 163/00* (2013.01); *C01P 2006/10* (2013.01); *C01P 2006/11* (2013.01); *C01P 2006/12* (2013.01); *C01P 2006/22* (2013.01); *C01P 2006/80* (2013.01); *Y10T 428/2995* (2015.01)

(58) Field of Classification Search
CPC ................... Y10T 428/2991; Y10T 428/2995
USPC .................. 428/403–407; 427/212
See application file for complete search history.

(56) References Cited

U.S. PATENT DOCUMENTS

| | | | |
|---|---|---|---|
| 5,700,616 A | 12/1997 | Kasuya et al. | |
| 7,262,233 B2* | 8/2007 | Isarov | ....................... C08K 9/06 427/214 |
| 9,581,922 B2* | 2/2017 | Sanchez Garcia | .... C09C 1/3081 |
| 2005/0113488 A1* | 5/2005 | Isarov | ....................... C08K 9/06 523/212 |
| 2006/0269465 A1 | 11/2006 | Mitani et al. | |
| 2010/0233059 A1 | 9/2010 | Meyer et al. | |
| 2010/0263574 A1* | 10/2010 | Gottschalk-Gaudig | ..................... C09C 1/3081 106/287.13 |
| 2010/0286311 A1 | 11/2010 | Meyer et al. | |
| 2015/0008355 A1* | 1/2015 | Mund | ..................... C08L 83/04 252/8.57 |
| 2017/0363985 A1 | 12/2017 | Yamano et al. | |

FOREIGN PATENT DOCUMENTS

| | | |
|---|---|---|
| CN | 1138169 A | 12/1996 |
| CN | 101200601 A | 6/2008 |
| CN | 101755017 A | 6/2010 |
| CN | 103435056 A | 12/2013 |
| CN | 106978103 A | 7/2017 |
| JP | H07-271087 A | 10/1995 |
| JP | H07-295284 A | 11/1995 |
| JP | 2004-099690 A | 4/2004 |
| JP | 2004-352606 A | 12/2004 |
| JP | 2009-292915 A | 12/2009 |
| JP | 2011-516373 A | 5/2011 |
| JP | 2016-110095 A | 6/2016 |
| JP | 2016-138035 A | 8/2016 |

OTHER PUBLICATIONS

Extended European Search Report for corresponding Application No. EP 18781493.4 dated Nov. 11, 2020 (6 Pages).

* cited by examiner

*Primary Examiner* — Hoa (Holly) Le
(74) *Attorney, Agent, or Firm* — Harness, Dickey & Pierce, P.L.C.

(57) ABSTRACT

A silicone oil-treated fumed silica and a method of producing the silicone oil-treated fumed silica are provided. The silicone oil-treated fumed silica, which has the following physical properties: A) the silicone oil-treated fumed silica has a degree of hydrophobicity of 68 vol % or more; B) the silicone oil-treated fumed silica has a silicone oil fixation rate of from 60 mass % to 95 mass %; and C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPa·s or more after the composition is left to stand at 25° C. for 1 hour.

13 Claims, No Drawings

SILICONE OIL-TREATED FUMED SILICA, MANUFACTURING METHOD AND APPLICATION THEREOF

CROSS-REFERENCE TO RELATED APPLICATIONS

This application is a U.S. National Phase Application under 35 U.S.C. 371 of International Application No. PCT/CN2018/080614, filed on Mar. 27, 2018 and published in Chinese as WO 2018/184486 A1 on Oct. 11, 2018 which is based on and claims the benefit of priority from Chinese Patent Application No. 201710222187.3 filed on Apr. 7, 2017. The entire disclosures of all of the above applications are incorporated herein by reference.

BACKGROUND

Technical Field

The present invention relates to the technical field of silica, and more particularly, to the technical field of fumed silica. Specifically, the present invention relates to a silicone oil-treated fumed silica, and a production method therefor and applications thereof.

Related Art

Adhesives are used for various applications such as electronic material applications and building material applications. Of such adhesives, an epoxy resin adhesive is highly versatile, and in general, is used as a two-component epoxy-based adhesive by combining a base containing an epoxy resin as a main component and a curing agent containing an amine compound as a main component (hereinafter sometimes abbreviated as "amine curing agent"). As performance required for the adhesive, there are given a thickening property and a liquid drip preventing property with the aim of achieving satisfactory applicability. Such properties are also required for the amine curing agent with the aim of achieving handleability at the time of mixing with the epoxy resin. Therefore, a thickener is required to be blended with the amine curing agent. While silica is used as the thickener, of such silica, in particular, so-called fumed silica obtained by a flame pyrolysis method is versatile.

However, a large number of hydrophilic silanol groups are present on the surface of fumed silica. Accordingly, when fumed silica is blended as it is with the amine curing agent, fumed silica is easily compatible with the amine curing agent, which is highly hydrophilic, and hence a desired satisfactory thickening effect and a desired liquid drip preventing effect as described above cannot be obtained. Therefore, fumed silica is subjected to surface treatment to be hydrophobized and reduced in density of the surface silanol groups, and is thus improved in thickening property. As a surface treatment agent to be used therefor, a silicone oil is suitable (for example, see JP 2004-99690 A).

Surface treated products of fumed silica with a silicone oil that have hitherto been provided are each obtained by spraying a silicone oil on fumed silica at high temperature and subjecting the fumed silica to heat treatment for a certain period of time (see CN 101755017 A, CN 103435056 A and JP 07-271087 A). Herein, in the spray treatment of fumed silica with a silicone oil, a large amount of the silicone oil, which is not bonded to fumed silica, is excessively heated to be oxidized and decomposed, to thereby volatilize. Besides, a combustible substance is liable to be generated as a by-product. Therefore, from a safety viewpoint, the spray treatment is performed under an inert gas atmosphere, such as a nitrogen atmosphere, and also the subsequent heat treatment is successively performed under the same inert gas atmosphere by an ordinary method (see CN 101755017 A and CN 103435056 A). In addition, it is also known that, when the spray treatment is not performed under the inert gas atmosphere, a series of such surface treatments are performed at a relatively low treatment temperature below 150° C. (see paragraph 0067 of JP 07-271087 A).

However, even when such silicone oil-treated fumed silica obtained by each of the related-art methods is used, an improving effect on dispersibility in the amine curing agent is not sufficient. When a desired thickening property and a desired liquid drip preventing property are to be obtained, it is required to add a silicone oil in a large amount at the time of production of the silicone oil-treated fumed silica. In addition, even when a high thickening property is obtained once in the early stage of mixing with the amine curing agent, a reduction in viscosity gradually occurs with time. An improvement in such thickening stability is also desired.

The present invention has been made in view of the above-mentioned circumstances and the like, and an object of the present invention is to provide a silicone oil-treated fumed silica which exhibits an excellent thickening property and excellent thickening stability when blended in an amine-based composition containing an amine compound, and a curing agent for a two-component epoxy-based adhesive using the same.

Another object of the present invention is to provide a method of producing the silicone oil-treated fumed silica. The production method is easily performed at low cost.

Still another object of the present invention is to provide applications of the silicone oil-treated fumed silica. When the silicone oil-treated fumed silica is blended in an amine-based composition containing an amine compound, a satisfactory thickening property and satisfactory thickening stability are obtained. Therefore, the silicone oil-treated fumed silica can also be used for an amine composition for a two-component epoxy-based adhesive.

SUMMARY

In order to achieve the above-mentioned objects, according to one embodiment of the present invention, there is provided a silicone oil-treated fumed silica. The silicone oil-treated fumed silica has a feature of satisfying the following physical properties A) to C):

A) the silicone oil-treated fumed silica has a degree of hydrophobicity of 68 vol % or more;
B) the silicone oil-treated fumed silica has a silicone oil fixation rate of from 60 mass % to 95 mass %; and
C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPa·s or more after the composition is left to stand at 25° C. for 1 hour.

It is preferred that the silicone oil-treated fumed silica have a specific surface area of from 50 $m^2/g$ to 130 $m^2/g$.

It is preferred that the silicone oil-treated fumed silica have a total carbon amount of from 5 mass % to 8 mass %.

It is preferred that the silicone oil-treated fumed silica include Na, K, Ca, Mg, Fe, and Al as metal impurities, and contents of the metal impurities be each 0.1 ppm or less.

It is preferred that the silicone oil-treated fumed silica further have the following physical property: D) a thixotropic index (TI) measured for a composition obtained in the same manner as in the item C) is 4.8 or more after a temperature of the composition is retained at 25° C. for 1 hour.

It is most preferred that the silicone oil-treated fumed silica further have the following physical property: D') a TI residual rate represented by the following equation and determined for a composition obtained in the same manner as in the item C) is 45% or more.

TI residual rate (%)=TI of the composition 31 hours after beginning of temperature retention at 25° C./TI of the composition 1 hour after beginning of temperature retention at 25° C.×100

It is preferred that the silicone oil-treated fumed silica further have the following physical property: C') a viscosity residual rate represented by the following equation and determined for a composition obtained in the same manner as in the item C) is 70% or more.

Viscosity residual rate (%)=viscosity of the composition 31 hours after beginning of temperature retention at 25° C./viscosity of the composition 1 hour after beginning of temperature retention at 25° C.×100

It is preferred that the amine composition be used as an amine curing agent for an adhesive.

It is most preferred that the adhesive include a two-component epoxy-based adhesive.

It is preferred that the silicone oil-treated fumed silica be produced by the following method: a method including causing a silicone oil to adhere to a surface of fumed silica under an inert gas atmosphere at from 150° C. to 300° C., followed by subjecting the fumed silica to high temperature treatment under an oxygen-containing gas atmosphere at from 150° C. to 300° C.

It is most preferred that the oxygen-containing gas have an oxygen concentration of 12 vol % or more.

It is most preferred that the inert gas atmosphere include a nitrogen atmosphere.

It is most preferred that the fumed silica have a specific surface area of from 30 m²/g to 420 m²/g.

It is most preferred that the fumed silica have a bulk density of from 20 g/L to 70 g/L.

It is most preferred that the silicone oil include a dimethyl silicone oil.

It is most preferred that the silicone oil have a viscosity at 25° C. of from 20 cSt to 500 cSt.

The silicone oil-treated fumed silica according to the embodiment of the present invention is used as an additive in producing an amine-based composition containing an amine compound.

It is preferred that the amine-based composition be used as a curing agent for a two-component epoxy-based adhesive.

According to one embodiment of the present invention, there is provided a method of producing the silicone oil-treated fumed silica. The method of producing the silicone oil-treated fumed silica has a feature of including the following step: causing a silicone oil to adhere to a surface of fumed silica under an inert gas atmosphere at from 150° C. to 300° C., followed by subjecting the fumed silica to high temperature treatment under an oxygen-containing gas atmosphere at from 150° C. to 300° C. to obtain the silicone oil-treated fumed silica.

It is preferred that the oxygen-containing gas have an oxygen concentration of 12 vol % or more.

It is preferred that the inert gas atmosphere include a nitrogen atmosphere.

It is preferred that the fumed silica have a specific surface area of from 30 m²/g to 420 m²/g.

It is preferred that the fumed silica have a bulk density of from 20 g/L to 70 g/L.

It is preferred that the silicone oil include a dimethyl silicone oil.

It is preferred that the silicone oil have a viscosity at 25° C. of from 20 cSt to 500 cSt.

It is preferred that the silicone oil-treated fumed silica satisfy the following physical properties A) to C):

A) the silicone oil-treated fumed silica has a degree of hydrophobicity of 68 vol % or more;

B) the silicone oil-treated fumed silica has a silicone oil fixation rate of from 60 mass % to 95 mass %; and C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPa·s or more after the composition is left to stand at 25° C. for 1 hour.

It is most preferred that the silicone oil-treated fumed silica have a specific surface area of from 15 m²/g to 210 m²/g.

It is most preferred that the silicone oil-treated fumed silica have a total carbon amount of from 5 mass % to 8 mass %.

It is most preferred that Na, K, Ca, Mg, Fe, and Al serving as metal impurities in the silicone oil-treated fumed silica be each 0.1 ppm or less.

It is most preferred that the silicone oil-treated fumed silica further have the following physical property: D) a thixotropic index (TI) measured for a composition obtained in the same manner as in the item C) is 4.8 or more after a temperature of the composition is retained at 25° C. for 1 hour.

The silicone oil-treated fumed silica further has the following physical property: D') a TI residual rate represented by the following equation and determined for a composition obtained in the same manner as in the item C) is 45% or more.

TI residual rate (%)=TI of the composition 31 hours after beginning of temperature retention at 25° C./TI of the composition 1 hour after beginning of temperature retention at 25° C.×100

It is most preferred that the silicone oil-treated fumed silica further have the following physical property: C') a viscosity residual rate represented by the following equation and determined for a composition obtained in the same manner as in the item C) is 70% or more.

Viscosity residual rate (%)=viscosity of the composition 31 hours after beginning of temperature retention at 25° C./viscosity of the composition 1 hour after beginning of temperature retention at 25° C.×100

It is most preferred that the amine composition include an amine curing agent for an adhesive.

Further, the adhesive includes a two-component epoxy-based adhesive.

According to one embodiment of the present invention, there is provided a silicone oil-treated fumed silica. The silicone oil-treated fumed silica has a feature of being produced by the above-mentioned method of producing the silicone oil-treated fumed silica.

According to one embodiment of the present invention, there is provided an application of the silicone oil-treated fumed silica as an additive for a two-component epoxy-based adhesive containing an amine compound.

Advantageous Effects of Invention

The present invention includes the following.

1. The silicone oil-treated fumed silica of the present invention has the following physical properties A) to C): A) the silicone oil-treated fumed silica has a degree of hydrophobicity of 68 vol % or more; B) the silicone oil-treated fumed silica has a silicone oil fixation rate of from 60 mass % to 95 mass %; and C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPa·s or more after the composition is left to stand at 25° C. for 1 hour. With this, when the silicone oil-treated fumed silica is blended with an amine compound, a satisfactory thickening property and satisfactory thickening stability are obtained, and hence the silicone oil-treated fumed silica can also be used for an amine composition for an epoxy resin.

2. The method of producing the silicone oil-treated fumed silica of the present invention includes the following step: causing a silicone oil to adhere to a surface of fumed silica under an inert gas atmosphere at from 150° C. to 300° C., followed by subjecting the fumed silica to high temperature treatment under an oxygen-containing gas atmosphere at from 150° C. to 300° C. With this, the silicone oil-treated fumed silica is easily produced at low cost.

3. The silicone oil-treated fumed silica of the present invention can be used for an amine curing agent contained in a two-component epoxy-based adhesive, and is used as a thickener in the amine curing agent in the two-component epoxy-based adhesive. With this, when the silicone oil-treated fumed silica is mixed with an amine compound, a satisfactory thickening property and satisfactory thickening stability are obtained. In addition, the silicone oil-treated fumed silica can also be used for an amine composition for an epoxy resin.

The objects, features, and advantages of the present invention can be sufficiently expressed in the Description of Embodiments described below and Claims. In addition, the objects, features, and advantages of the present invention can be sufficiently expressed by combining specific means or a specific device described in Claims.

DETAILED DESCRIPTION

The inventors of the present invention have made extensive investigations in order to achieve the above-mentioned objects. As a result, the inventors have successfully developed a specific silicone oil-treated fumed silica that has both a high degree of hydrophobicity and a high silicone oil fixation rate, and exhibits an excellent thickening property when blended in an amine curing agent. Thus, the present invention has been completed.

The present invention provides a silicone oil-treated fumed silica that is fumed silica subjected to surface treatment with a silicone oil and satisfies the following physical properties A) to C):

A) the silicone oil-treated fumed silica has a degree of hydrophobicity of 68 vol % or more;

B) the silicone oil-treated fumed silica has a silicone oil fixation rate of from 60 mass % to 95 mass %; and C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPa·s or more after the composition is left to stand at 25° C. for 1 hour.

The present invention also provides a method of producing the silicone oil-treated fumed silica, including causing a silicone oil to adhere to the surface of fumed silica under an inert gas atmosphere at from 150° C. to 300° C., followed by subjecting the fumed silica to high temperature treatment under an oxygen-containing gas atmosphere at from 150° C. to 300° C.

The present invention also provides a curing agent for a two-component epoxy-based adhesive containing an amine compound and the silicone oil-treated fumed silica, the curing agent being used for a two-component epoxy-based adhesive.

In the silicone oil-treated fumed silica of this embodiment, fumed silica, that is, silica obtained by a flame pyrolysis method is used as silica serving as a base material by virtue of having a low water content and low contents of metal impurities, and having excellent fluidity. Herein, the flame pyrolysis method refers to a method involving combusting a silicon compound or a metal silicon in an oxyhydrogen flame to produce silica particles. In particular, the silicon compound to be used is generally silicon tetrachloride or the like. The fumed silica is sometimes called "dry silica" or "vapor-phase silica" so that the fumed silica is distinguished from silica produced by a wet method, such as precipitated silica.

Of such fumed silica, when fumed silica having an excessively small specific surface area is used, the silicone oil-treated fumed silica is required to be added in a large amount in order to exhibit a thickening effect, and when fumed silica having an excessively large specific surface area is used, the dispersibility of the silicone oil-treated fumed silica in a resin tends to be reduced. Therefore, the specific surface area of the fumed silica measured by a single point BET method is suitably from 30 $m^2/g$ to 420 $m^2/g$, preferably from 100 $m^2/g$ to 350 $m^2/g$, more preferably from 120 $m^2/g$ to 250 $m^2/g$.

In addition, the bulk density of the fumed silica is preferably from 20 g/L to 70 g/L, more preferably from 25 g/L to 50 g/L in order to effectively exhibit the thickening effect. The bulk density is a value obtained by loading the fumed silica, whose weight has been measured, in a 1 L cylinder and measuring the volume of the fumed silica after the fumed silica is left to stand still for 30 minutes.

Such fumed silica to be used as a base material has a silanol group on the surface and is thus hydrophilic, and is substantially free of carbon before treatment with a silicone oil. In addition, a value for the degree of hydrophobicity of the fumed silica described below is generally 0.

The silicone oil to be used in the surface treatment is not particularly limited, and specific examples thereof include a dimethyl silicone oil, a methyl phenyl silicone oil, a methyl hydrogen silicone oil, a carboxy-modified silicone oil, a carbinol-modified silicone oil, a polyether-modified silicone oil, an alkyl-modified silicone oil, and a fluorine-modified silicone oil. Of those, a dimethyl silicone oil is particularly preferred.

The viscosity of the silicone oil as a value measured at 25° C. is preferably from 20 cSt to 500 cSt. When the viscosity is less than 20 cSt, the silicone oil volatilizes and the surface treatment is not performed sufficiently. When the viscosity is more than 500 cSt, uniformity of the treatment tends to be reduced owing to a high viscosity. In addition, as a viscosity range in which both a high silicone oil fixation rate and a high viscosity can be achieved, a viscosity range of from 50 cSt to 200 cSt is particularly suitable. In addition, the silicone oils may be used as a mixture thereof.

The silicone oil-treated fumed silica of this embodiment is obtained by subjecting the fumed silica to surface treatment with the silicone oil. In addition, the silicone oil-treated fumed silica of this embodiment satisfies the following physical properties A) to C):

A) the silicone oil-treated fumed silica has a degree of hydrophobicity of 68 vol % or more;

B) the silicone oil-treated fumed silica has a silicone oil fixation rate of from 60 mass % to 95 mass %; and C) a composition obtained by adding 6 parts by mass of the silicone oil-treated fumed silica of this embodiment to 100 parts by mass of an amine composition containing trimethylolpropane polyoxypropylene triamine (kinematic viscosity at 25° C.: 72 cSt) and 1,3-bis(aminomethyl)cyclohexane at a mass ratio of 95:5 has a viscosity of 4,000 mPa·s or more after the composition is left to stand at 25° C. for 1 hour.

Herein, the degree of hydrophobicity of the item A) is 68 vol % or more, preferably 70 vol % or more. Such a high degree of hydrophobicity means that the surface of the fumed silica has been highly surface treated with the silicone oil, which is required for improving dispersibility in various amine-based compositions. The case in which the degree of hydrophobicity of the silica is low is not preferred because the viscosity of the amine-based composition is reduced. An upper limit of the degree of hydrophobicity is not particularly limited, but in general, is suitably 80 vol % or less, more suitably 75 vol % or less.

In this embodiment, the degree of hydrophobicity of the silicone oil-treated fumed silica of the item A) is determined as described below. 0.2 g of the silicone oil-treated fumed silica is added to 50 ml of water in a beaker having a volume of 250 ml, and methanol is gradually added thereto while the content is stirred. A time point when the powdery silicone oil-treated fumed silica in its entire amount is wetted with and suspended in a solvent in the beaker is regarded as an end point, and measurement is performed at the end point. The degree of hydrophobicity is determined as the amount of methanol in terms of vol % in the methanol-water mixed solvent at the end point.

In addition, the silicone oil fixation rate of the item B) is from 60 mass % to 95 mass %, preferably from 70 mass % to 95 mass %, most preferably from 70 mass % to 90 mass %. Herein, the silicone oil present on the surfaces of silica particles having been subjected to treatment with the silicone oil has two forms: one bonded to the surface of the fumed silica ("fixed silicone oil"); and the other one physically adsorbed onto the surface of the fumed silica ("free silicone oil"). Therefore, no matter how large the amount of the silicone oil that covers the surface of the fumed silica through the surface treatment is, and how high the degree of hydrophobicity is, when large part of such silicone oil is occupied by the free silicone oil, a considerable amount of the silicone oil is released when actually blended with an amine-based composition, with the result that thickening property or thickening stability to be expected cannot be obtained. Therefore, the silicone oil fixation rate of the silicone oil-treated fumed silica is required to fall within the high range described above.

In the present invention, the "silicone oil fixation rate FR [%]" refers to a value represented by the following equation (1).

$$FR = 100 \times F(\text{Oil})/T(\text{Oil}) \qquad \text{Equation (1)}$$

In the equation (1), F (Oil) represents the amount [g] of a fixed silicone oil, and T (Oil) represents the total carbon-equivalent amount [g] of a silicone oil.

The total carbon-equivalent amount T (Oil) of a silicone oil and the amount F (Oil) of a fixed silicone oil in the equation (1) may be determined by the following procedure.

Total Carbon-Equivalent Amount T (Oil) of Silicone Oil

First, the total carbon amount T (Carbon) [g] of a silicone oil is determined by subjecting 0.1 g of the silicone oil-treated fumed silica to measurement with a carbon content measurement device (Sumigraph NC-22F manufactured by Sumika Chemical Analysis Service, Ltd.) based on a combustion method. Next, the total carbon-equivalent amount T (Oil) [g] of the silicone oil is determined by the following equation (2).

$$T(\text{Oil}) = T(\text{Carbon}) \times \text{molecular weight of used silicone oil/carbon amount of used silicone oil in a molecule thereof} \qquad \text{Equation(2)}$$

Herein, the molecular weight of the used silicone oil and the carbon amount of the used silicone oil in a molecule thereof may be calculated as values per unit structure of a main chain of the silicone oil. The same applies to the following equation (3).

When the total carbon amount T of the silicone oil is represented by wt %, this value means a mass ratio of the total carbon amount T [g] of the silicone oil with respect to 0.1 g of the silicone oil-treated fumed silica.

Amount F (Oil) of Fixed Silicone Oil

First, 0.5 g of the silicone oil-treated fumed silica and 32 ml of normal hexane are loaded in a centrifuge tube having a volume of 50 ml, and subjected to ultrasonic washing (ultrasonic washer 1510HMTH manufactured by Yamato Scientific Co., Ltd.) in which a ultrasonic wave at a power of 90 W is applied for 30 minutes to obtain a suspension. The resultant suspension is subjected to centrifuge separation, and a solid phase is separated and collected. 32 ml of normal hexane is added to the collected solid phase, and the resultant suspension is repetitively subjected to the operations of ultrasonic treatment and centrifuge separation three times to obtain a solid phase (silica on which only a fixed silicone oil bonded to the surface of the silica remains). Next, the resultant solid phase is dried under reduced pressure (120° C., 12 hours) to obtain dry powder, and the dry powder is measured for weight. Thus, the total weight [g] of the silica on which only a fixed silicone oil remains is measured. 0.1 g of the silica on which only a fixed silicone oil remains is sampled, and is measured for carbon content with a carbon content measurement device (Sumigraph NC-22F manufactured by Sumika Chemical Analysis Service, Ltd.) based on a combustion method. Thus, the carbon amount F (Carbon) [g] of the fixed silicone oil is determined. Next, the amount F (Oil) [g] of the fixed silicone oil is determined by the following equation (3).

$$F(\text{Oil}) = F(\text{carbon}) \times \text{molecular weight of used silicone oil/carbon amount of used silicone oil in a molecule thereof} \times \text{total weight [g] of silica on which only fixed silicone oil remains/0.1 [g]} \times 0.1 \text{ [g]}/0.5 \text{ [g]} \qquad \text{Equation(3)}$$

In the equation (3), the amount (temporary F (Oil)) of the fixed silicone oil with respect to 0.1 g of the silica on which only a fixed silicone oil remains is calculated by the "F (carbon)×molecular weight of used silicone oil/carbon amount of used silicone oil in a molecule thereof" in the former part. However, the value corresponds to the amount of the fixed silicone oil with respect to the "0.1 g of silica on which only a fixed silicone oil remains," and hence it is required that the value be corrected into the amount of the fixed silicone oil with respect to "0.1 g of the silicone oil-treated fumed silica." Therefore, in the latter part of the equation (3), the calculated temporary F (Oil) is multiplied by the "total weight [g] of silica on which only fixed silicone oil remains/0.1 [g]×0.1 [g]/0.5 [g]." Thus, the target amount F (Oil) of the fixed silicone oil is calculated.

For reference, a liquid phase obtained through the centrifuge separation includes the free silicone oil physically adsorbed onto the surface. Herein, the amount I (Oil) [g] of the free silicone oil is represented by the following equation (4).

$$I(\text{Oil}) = T(\text{Oil}) - F(\text{Oil}) \quad \text{Equation (4)}$$

In addition, the numerical parameters T (Oil), F (Oil), I (Oil), T (carbon), and F (carbon) in the equations (1) to (4) are each a value [g] per 0.1 g of the silicone oil-treated fumed silica used for the measurement by a combustion method.

When values [g] for those numerical parameters are each converted into a value [g/m$^2$] per unit surface area of fumed silica serving as a raw material used for production of the silicone oil-treated fumed silica used for the measurement, the value of interest may be divided by a conversion factor C [m$^2$] represented by the following equation (5). In addition, when the value of interest is converted into a value in terms of mg/m$^2$, a numerical value in terms of g/m$^2$ may be multiplied by 1,000. The conversion factor C means the surface areas of main bodies of fumed silica particles per 0.1 g of the silicone oil-treated fumed silica used for the measurement by a combustion method.

$$C = Mb \times S \quad \text{Equation (5)}$$

In the equation (5), Mb represents a value [g] obtained by subtracting the total carbon-equivalent amount T (Oil) [g] of a silicone oil from the mass (0.1 g) of the silicone oil-treated fumed silica used for the measurement by a combustion method (the mass of the main bodies of the silica particles obtained by excluding the silicone oil from 0.1 g of the silicone oil-treated fumed silica used for the measurement), and S represents the specific surface area [m$^2$/g] of fumed silica serving as a raw material used for the production of the silicone oil-treated fumed silica used for the measurement.

When the specific surface area S of the fumed silica serving as a raw material is unknown, the specific surface area S may be determined by the following procedure. First, the silicone oil-treated fumed silica is heated at 650° C. or more for 2 hours or more to thermally decompose the fixed silicone oil and the free silicone oil. With this, the main bodies of the silica particles on each of which the silicone oils have been removed from the surface (i.e., the fumed silica serving as a raw material) are obtained. Subsequently, the main bodies of the silica particles obtained by the heat treatment are measured for specific surface areas by a single point BET method, and thus the specific surface area S of the fumed silica serving as a raw material is determined.

The total carbon amount of the silicone oil-treated fumed silica of the present invention falls within the range of preferably from 3 mass % to 8 mass %, more preferably from 5 mass % to 8 mass % from the viewpoint of obtaining a sufficient degree of hydrophobicity.

Further, the silicone oil-treated fumed silica of the present invention has the following feature:

C) a composition obtained by adding 6 parts by mass of the silicone oil-treated fumed silica to 100 parts by mass of an amine composition containing trimethylolpropane polyoxypropylene triamine (kinematic viscosity at 25° C.: 72 cSt) and 1,3-bis(aminomethyl)cyclohexane at a mass ratio of 95:5 has a viscosity of 4,000 mPa·s or more, suitably from 4,000 mPa·s to 10,000 mPa·s after the composition is left to stand at 25° C. for 1 hour.

The above-mentioned amine composition is a typical form used as a curing agent for a two-component epoxy-based adhesive (for example, see JP 2015-524875 A).

Therefore, the property of the item C) of exhibiting a high viscosity when blended with the amine composition means that the silicone oil-treated fumed silica of this embodiment is suitable for an amine curing agent to be used as a curing agent for a two-component epoxy-based adhesive.

Specifically, when fumed silica is subjected to surface treatment with a silicone oil so as to achieve a high degree of hydrophobicity of the item A) and a high silicone oil fixation rate of the item B), such fumed silica is dispersed in the amine curing agent satisfactorily to some extent, and exhibits a thickening effect to some extent. However, operation of an epoxy resin to be used for, for example, electronic material applications is becoming increasingly sophisticated every year, and a further improvement in thickening property for the amine curing agent is also demanded. From this viewpoint, silicone oil-treated fumed silica increased in the degree of hydrophobicity of the item A) and the silicone oil fixation rate of the item B) is unsatisfactory. Therefore, the silicone oil-treated fumed silica of this embodiment is specified by the level of viscosity when the silicone oil-treated fumed silica is blended with the amine composition described in the item C) to be used as the amine curing agent.

The reason why the viscosity of the amine composition of the item C) is not sufficiently increased even when the silicone oil-treated fumed silica has a high degree of hydrophobicity of the item A) and a high silicone oil fixation rate of the item B) is not always known, but it can be presumed that uniformity of surface treatment of fumed silica particles is involved therein. That is, the surface treatment with a silicone oil is performed unevenly on the scale of the individual particles. Therefore, even when the particles are treated at the high degree of hydrophobicity and the high silicone oil fixation rate in their entireties, some of the particles insufficiently subjected to fixation treatment are unevenly distributed. Such particles are considered to slightly inhibit dispersion in the amine composition described in the item C) to suppress an increase in viscosity.

In contrast to this, in the silicone oil-treated fumed silica of this embodiment, it is presumed that uniformity of surface fixation treatment of a silicone oil can be increased more than in the related art, for example, by adopting a specific production method, and thus not only the degree of hydrophobicity of the item A) and the silicone oil fixation rate of the item B) but also the viscosity at the time of blending with the amine composition of the item C) can be highly increased. In addition, it is presumed that the same actions and effects as described above are exhibited in the case of various amine-based compositions other than the amine composition described in the item C).

In the present invention, a specific measurement method for the requirement C) is as described below. First, 12 parts by weight of the silicone oil-treated fumed silica is mixed with an amine composition containing 190 parts by weight of trimethylolpropane polyoxypropylene triamine [CAS number: 39423-51-3] (kinematic viscosity at 25° C.: 72 cSt) and 10 parts by weight of 1,3-bis(aminomethyl)cyclohexane [CAS number: 2579-20-6]. After that, the silicone oil-treated fumed silica is dispersed therein at 4,000 rpm for 10 minutes with a high-speed disperser. The temperature of the resultant composition is retained at 25° C. for 1 hour, and then measured for viscosity with a BL-type viscometer (e.g., Viscomerer BL manufactured by Toki Sangyo Co., Ltd.). The viscosity may be measured by the above-mentioned method. At this time, the viscosity of the amine composition is determined as a value (mPa·s) measured at 60 rpm with the BL-type viscometer.

In addition, the silicone oil-treated fumed silica of this embodiment preferably has the following physical property: D) a thixotropic index (TI) measured for a composition obtained in the same manner as in the item C) is 4.8 or more after the temperature of the composition is retained at 25° C. for 1 hour. Such TI is more preferably from 4.8 to 6.0. The TI is determined by the following equation. A composition having a value close to 1 becomes a Newtonian fluid, and a composition having a higher value has a higher thickening property and is less liable to drip.

TI=viscosity at 6 rpm/viscosity at 60 rpm×10

In the above-mentioned equation for determining the TI, the viscosity at 6 rpm and the viscosity at 60 rpm are each a value measured with the BL-type viscometer.

Further, in light of a high silicone oil fixation rate of the item B) and excellent thickening stability, the silicone oil-treated fumed silica of this embodiment preferably has the following physical property: C') a viscosity residual rate represented by the following equation and determined for a composition obtained in the same manner as in the item C) is suitably 70% or more, more suitably 72% or more.

Viscosity residual rate (%)=viscosity 31 hours after beginning of temperature retention at 25° C./viscosity 1 hour after beginning of temperature retention at 25° C.×100

In the equation for determining the viscosity residual rate, the viscosity 31 hours after beginning of temperature retention at 25° C. and the viscosity 1 hour after beginning of temperature retention at 25° C. are each a value measured with the BL-type viscometer.

Similarly, the silicone oil-treated fumed silica of this embodiment preferably has the following physical property:

D') a TI residual rate represented by the following equation and determined for a composition obtained in the same manner as in the item C) is suitably 45% or more, more suitably 46% or more.

TI residual rate (%)=TI 31 hours after beginning of temperature retention at 25° C./TI 1 hour after beginning of temperature retention at 25° C.×100

In the equation for determining the TI residual rate, the TI 31 hours after beginning of temperature retention at 25° C. and TI 1 hour after beginning of temperature retention at 25° C. for are each a value measured with the BL-type viscometer.

The specific surface area of the silicone oil-treated fumed silica of this embodiment varies depending on the specific surface area of the fumed silica to be used as a base material and the amount of the silicone oil to be used and cannot be completely determined, but is generally from 15 $m^2/g$ to 210 $m^2/g$, preferably from 40 $m^2/g$ to 180 $m^2/g$, more preferably from 50 $m^2/g$ to 130 $m^2/g$.

As described above, the fumed silica is used as a base material. Therefore, the silicone oil-treated fumed silica of this embodiment has much smaller contents of metal impurities than precipitated silica synthesized in a solvent, and is advantageous when an amine-based composition in which the silicone oil-treated fumed silica is blended serves as an amine curing agent for an epoxy resin adhesive for, for example, electronic material applications. As the metal impurities, the contents of sodium, potassium, calcium, magnesium, iron, and aluminum are each generally 0.1 ppm or less.

Next, a method of producing the silicone oil-treated fumed silica of this embodiment having the above-mentioned properties is described. The silicone oil-treated fumed silica of this embodiment may be produced by any method as long as the silicone oil-treated fumed silica is obtained as fumed silica subjected to surface treatment with a silicone oil so as to satisfy the above-mentioned physical properties A) to C), but as a suitable production method, the following method is given. Specifically, there is given a method including causing a silicone oil to adhere to the surface of fumed silica under an inert gas atmosphere at from 150° C. to 300° C., followed by subjecting the fumed silica to high temperature treatment under an oxygen-containing gas atmosphere at from 150° C. to 300° C.

In the method, the high temperature treatment after causing the silicone oil to adhere to the surface of the fumed silica is performed in an oxygen-containing gas. With this, the silicone oil is fixed onto the surface of the fumed silica remarkably uniformly, and silicone oil-treated fumed silica having not only a high degree of hydrophobicity of the item A) and a high silicone oil fixation rate of the item B), but also a high viscosity at the time of blending with an amine composition of the item C) is obtained. A possible reason for this is as described below.

Specifically, in the high temperature treatment after causing the silicone oil to adhere to the surface of the fumed silica, a free silicone oil present on the surface of the fumed silica is partly decomposed and volatilizes. Some of the free silicone oil having been volatilized acts on the surface of the fumed silica and is bonded and fixed to residual silanol groups again. Such fixation is activated when the high temperature treatment is performed in an oxygen-containing gas, and the action is also exerted on fumed silica particles insufficiently subjected to fixation treatment of the silicone oil. As a result, the uniformity of the treatment is improved, and thus it is presumed that the silicone oil-treated fumed silica also improved in the physical property of the item C) is obtained.

As described above, in the production of silicone oil-treated fumed silica of the related art, the high temperature treatment after causing the silicone oil to adhere to the surface of the fumed silica is performed in a nitrogen atmosphere by an ordinary method. In this case, the fixation of the free silicone oil present on the surface of the fumed silica after the volatilization is not sufficiently effected. As a result, unevenness of surface treatment with the silicone oil is maintained, and thus it is considered that only silicone oil-treated fumed silica that cannot satisfy the physical property of the item C) is obtained.

Meanwhile, in the above-mentioned production method, the adhesion treatment of the silicone oil to the surface of the fumed silica prior to the high temperature treatment is required to be performed under an inert gas atmosphere, such as a nitrogen gas atmosphere, and the subsequent high temperature treatment in an oxygen-containing gas is performed by replacing the atmosphere with the oxygen-containing gas after the adhesion treatment of the silicone oil. That is, it is advantageous that also the adhesion treatment of the silicone oil to the surface of the fumed silica is performed at the high temperature of from 150° C. to 300° C. in order to exhibit its effect on the surface of the fumed silica more evenly.

However, as described above, in the operation of the surface treatment that involves spraying or that is performed, for example, under strong stirring, when such operation is performed at high temperature, there is a risk of ignition. Specifically, in the spray treatment of the fumed silica with the silicone oil, a large amount of the silicone oil, which is not bonded to the fumed silica, is excessively heated to be oxidized and decomposed, to thereby volatilize. Besides, a flammable substance is liable to be generated as a by-product. Accordingly, from a safety viewpoint, the spray treatment is performed under an inert gas atmosphere, such as a nitrogen atmosphere.

Herein, the temperatures of the adhesion treatment of the silicone oil to the surface of the fumed silica and the subsequent high temperature treatment are each particularly preferably from 200° C. to 300° C. When those treatment temperatures are each less than 150° C., the surface treatment with the silicone oil cannot be performed uniformly, and the resultant silicone oil-treated fumed silica cannot achieve the value specified in the present invention for the viscosity at the time of blending with an amine composition of the item C).

As a specific treatment method for the adhesion treatment of the silicone oil to the surface of the fumed silica, there are given, for example: a method involving spraying the silicone oil on fumed silica particles while mixing the particles with a mixer or in a fluidized bed; and a method involving dissolving the silicone oil in a solvent, such as toluene, dispersing silica particles in the solution, and evaporating the solvent. Of those, the former method based on the spraying is preferred from viewpoints of cost, safety, and an environment. For stirring in the mixer in the spray treatment, the number of rotations of the stirring and the shape of a stirring blade are preferably selected so that the silica particles are fluidized and a stable stirring state is obtained. It is preferred that the mixing with a mixer or in a fluidized bed be performed under the inert gas atmosphere for from 30 minutes to 180 minutes after bringing the fumed silica particles and the silicone oil into contact with each other by the above-mentioned method.

The adhesion amount of the silicone oil to the fumed silica varies depending on the specific surface area of the fumed silica to be used as a raw material, and hence cannot be completely specified, but is preferably from 3 parts by mass to 50 parts by mass, particularly preferably from 10 parts by mass to 30 parts by mass with respect to 100 parts by mass of the fumed silica serving as a raw material from the viewpoint of producing the silicone oil-treated fumed silica of this embodiment.

The inert gas atmosphere under which the adhesion treatment of the silicone oil is performed is most suitably formed of nitrogen, but may be formed of an inert gas, such as argon or helium.

The high temperature treatment of fumed silica after causing the silicone oil to adhere to the surface of the fumed silica is preferably performed in an oxygen-containing gas atmosphere which has replaced the inert gas atmosphere while stirring is performed in the same manner as in the case of the operation of the spraying of the silicone oil. In the high temperature treatment of fumed silica, more than half of the silicone oil having already been sprayed is bonded to the surface of the fumed silica, and hence there is a low risk of ignition unlike the adhesion treatment of the silicone oil, and stirring treatment can be performed.

The oxygen concentration of the oxygen-containing gas is not limited as long as the concentration is equal to or higher than an amount sufficient for promoting the fixation of the volatilized free silicone oil onto the surface of the fumed silica, but is preferably 12 vol % or more, more preferably 18 vol % or more. In consideration of safety, the oxygen concentration is preferably 30 vol % or less.

In the oxygen-containing gas, a gas component other than oxygen may be, for example, the above-mentioned inert gas. In addition, as the oxygen-containing gas, air can be suitably used because of including 21 vol % of oxygen.

Such high temperature treatment after the adhesion of the silicone oil is performed for a treatment time of preferably 30 minutes or more, particularly preferably from 60 minutes to 180 minutes.

The silicone oil-treated fumed silica of this embodiment can be used as hydrophobic silica to be blended with a functional material in various applications, such as electronic material applications and building material applications, without any limitation. In consideration of an excellent thickening effect on the amine-based composition, the silicone oil-treated fumed silica of this embodiment is desirably used for an application as an additive to be blended in an amine-based composition containing an amine compound (as a main component). The silicone oil-treated fumed silica of this embodiment is more suitably used as an additive to be blended in an amine curing agent for an epoxy resin (particularly for a two-component epoxy-based adhesive for electronic material applications and the like). When the silicone oil-treated fumed silica of this embodiment is used for such applications, an adhesive that has a high viscosity, is less liable to drip, and is excellent in handleability is advantageously obtained.

As the amine curing agent for a two-component epoxy-based adhesive, the one containing trimethylolpropane polyoxypropylene triamine (kinematic viscosity at 25° C.: 72 cSt) and 1,3-bis(aminomethyl)cyclohexane at a mass ratio of 95:5, which is adopted as a typical form of the amine curing agent in the requirement C), in which the level of the thickening property of the silicone oil-treated fumed silica of this embodiment is specified, is most preferred. In addition, other than this, any known amine curing agent containing an amine compound as a main component may serve as a blending target of the silicone oil-treated fumed silica of this embodiment without any limitation. In addition, the silicone oil-treated fumed silica of this embodiment may be appropriately blended in an amine-based composition that can be utilized in various applications other than the application of the amine curing agent for a two-component epoxy-based adhesive.

Specific examples thereof include: an amine curing agent containing at least one or more kinds of various amine compounds, such as ethylenediamine, 1,2-propanediamine, diethylenetriamine, triethylenetetraamine, polyethylenepolyamine, hexamethylenediamine, polyethylenediamine, trimethylolpropane polyoxypropylene triamine, aminoethylpiperazine, and 1,3-bis(aminomethyl)cyclohexane; and an amine-based composition to be utilized in various applications including the amine curing agent. Those amine-based compositions may have blended therein a pigment, a dye, or the like in addition to the amine compound.

In such amine-based composition, particularly in the amine curing agent, the blending amount of the silicone oil-treated fumed silica of this embodiment is generally from 2 parts by mass to 15 parts by mass with respect to 100 parts by mass of the amine compound. A preferred blending amount is such that the viscosity of the composition after the composition is left to stand at 25° C. for 1 hour is 4,000 mPa·s or more, more suitably from 4,500 mPa·s to 10,000 mPa·s. From this viewpoint, the silicone oil-treated fumed silica of this embodiment exhibits an excellent thickening effect on the amine-based composition, and hence is convenient because a viscosity desired for various applications, particularly for the application of the amine curing agent, can be achieved by suppressing its blending amount to a small amount of from 2 parts by mass to 10 parts by mass with respect to 100 parts by mass of the amine compound.

It is also preferred to blend the silicone oil-treated fumed silica of this embodiment not only in the amine curing agent but also in a base side containing an epoxy resin (as a main component) to be mixed with the amine curing agent. The silicone oil-treated fumed silica of this embodiment having an excellent hydrophobic property originally exhibits a satisfactory thickening property also for the above-mentioned epoxy resin. Further, such base is excellent in compatibility with the amine curing agent when mixed with the amine curing agent at the time of use. Also the resultant mixed composition has a high viscosity, is less liable to drip, and is excellent in handleability.

The present invention is specifically described below by way of Examples and Comparative Examples, but the present invention is not limited to these Examples.

Measurement of Specific Surface Area

The specific surface areas of fumed silica and silicone oil-treated fumed silica were each measured by a single point BET method based on a nitrogen adsorption amount with a specific surface area measurement device SA-1000 manufactured by Sibata Scientific Technology Ltd.

Measurement of Degree of Hydrophobicity 0.2 g of silicone oil-treated silica was added to 50 ml of water in a beaker having a volume of 250 ml, and the content was stirred with a magnetic stirrer. Methanol was added thereto with a buret. A time point when the powdery silicone oil-treated silica in its entire amount was wetted with and suspended in a solvent in the beaker was regarded as an end point, and measurement was performed at the end point. In this case, methanol was introduced into a solution with a tube so that methanol was prevented from being brought into direct contact with the silicone oil-treated silica. The amount of methanol in terms of vol % in the methanol-water mixed solvent at the end point was used as a degree of hydrophobicity.

Measurement of Silicone Oil Fixation Rate FR [%]

A silicone oil fixation rate FR [%] was determined as a value represented by the following equation (1).

$$FR=100 \times F(Oil)/T(Oil) \quad \text{Equation (1)}$$

In the equation (1), F (Oil) represents the amount [g] of a fixed silicone oil, and T (Oil) represents the total carbon-equivalent amount [g] of a silicone oil. Herein, F (Oil) and T (Oil) were determined through the following measurement.

Total Carbon-Equivalent Amount T (Oil) of Silicone Oil

First, the total carbon amount T (Carbon) [g] of a silicone oil was determined by subjecting 0.1 g of silicone oil-treated fumed silica to measurement with a carbon content measurement device (Sumigraph NC-22F manufactured by Sumika Chemical Analysis Service, Ltd.) based on a combustion method. Next, the total carbon-equivalent amount T (Oil) [g] of the silicone oil was determined by the following equation (2).

$$T(Oil)=T(Carbon) \times \text{molecular weight of used silicone oil/carbon amount of used silicone oil in a molecule thereof} \quad \text{Equation(2)}$$

Herein, the molecular weight of the used silicone oil and the carbon amount of the used silicone oil in a molecule thereof were each calculated as a value per unit structure of a main chain of the silicone oil. Specifically, a silicone oil including dimethyl siloxane as a main chain was used for surface treatment of silica in each of Examples, and hence T (Oil) was determined by the following equation as a value per unit structural formula of —(Si(CH$_3$)$_2$—O)—.

$$T(Oil)=T(carbon) \times (Si[28]+C[12] \times 2+H[1] \times 6+O[16])/(C[12] \times 2)$$

Amount F (Oil) of Fixed Silicone Oil

First, 0.5 g of the silicone oil-treated fumed silica and 32 ml of normal hexane were loaded in a centrifuge tube having a volume of 50 ml, and subjected to ultrasonic washing (ultrasonic washer 1510HMTH manufactured by Yamato Scientific Co., Ltd.) in which a ultrasonic wave at a power of 90 W was applied for 30 minutes to obtain a suspension. The resultant suspension was subjected to centrifuge separation, and a solid phase was separated and collected. 32 ml of normal hexane was added to the collected solid phase, and the resultant suspension was repetitively subjected to the operations of ultrasonic treatment and centrifuge separation three times to obtain a solid phase (silica on which only a fixed silicone oil bonded to the surface of the silica remained). Next, the resultant solid phase was dried under reduced pressure (120° C., 12 hours) to obtain dry powder, and the dry powder was measured for weight. Thus, the total weight [g] of the silica on which only a fixed silicone oil remained was measured. 0.1 g of the silica on which only a fixed silicone oil remained was sampled, and was measured for carbon content with a carbon content measurement device (Sumigraph NC-22F manufactured by Sumika Chemical Analysis Service, Ltd.) based on a combustion method. Thus, the carbon amount F (Carbon) [g] of the fixed silicone oil was determined. Next, the amount F (Oil) [g] of the fixed silicone oil was determined by the following equation (3).

$$F(Oil)=F(carbon) \times \text{molecular weight of used silicone oil/carbon amount of used silicone oil in a molecule thereof} \times \text{total weight [g] of silica on which only fixed silicone oil remains}/0.1 \text{ [g]} \times 0.1 \text{ [g]}/0.5 \text{ [g]} \quad \text{Equation(3)}$$

Measurement of Bulk Density

Fumed silica was loaded in a 1 L cylinder made of plastic so that the fumed silica was prevented from overflowing, and was confirmed for volume after left to stand still for 30 minutes. The bulk density was calculated from the weight of the fumed silica having been loaded and the volume.

Measurement of Viscosity and TI

12 Parts by mass (6 mass % with respect to 100 mass % of an amine composition) of silicone oil-treated fumed silica was mixed with an amine composition containing 190 parts by mass of trimethylolpropane polyoxypropylene triamine (JEFAMIN T-403 manufactured by Huntsman International LLC., kinematic viscosity at 25° C.: 72 cSt) and 10 parts by mass of 1,3-bis(aminomethyl)cyclohexane (manufactured by MITSUBISHI GAS CHEMICAL COMPANY, INC.) (mass ratio: 95:5) with a glass rod, and the mixture was left to stand for 3 minutes. After that, the silicone oil-treated fumed silica was dispersed therein at 4,000 rpm for 10 minutes with a high-speed disperser (HOMOGENIZING DISPER Model 2.5 manufactured by PRIMIX Corporation, dispersing disc diameter: 40 mm). After the temperature of the resultant sample was retained at 25° C. for 1 hour, the sample was loaded in a BL-type viscometer (Viscometer BL manufactured by Toki Sangyo Co., Ltd.) and measured for viscosity. The sample was also measured for viscosity 31 hours after the beginning of temperature retention. The viscosity was a value (mPa·s) measured at 60 rpm with the BL-type viscometer, and TI was determined by the following equation.

TI=viscosity at 6 rpm/viscosity at 60 rpm×10

A viscosity residual rate and a TI residual rate were determined by the following equations. The "temperature retention" refers to a case of retaining a temperature at 25° C.

Viscosity residual rate (%)=viscosity 31 hours after beginning of temperature retention/viscosity 1 hour after beginning of temperature retention× 100

TI residual rate (%)=TI 31 hours after beginning of temperature retention/TI 1 hour after beginning of temperature retention×100

Liquid Drip Test 53 g of silicone oil-treated fumed silica was added to 1 kg of an epoxy resin (EPIKOTE 828 manufactured by HEXION Specialty Chemicals, Inc.), and the content was stirred for about 1 hour until the silicone oil-treated fumed silica was dispersed therein. In addition, 53 g of silicone oil-treated fumed silica was added to 1 kg of an amine curing agent (JEFAMIN T-403 manufactured by Huntsman International LLC.), and the content was stirred for about 1 hour until the silica was dispersed therein. The epoxy resin and the amine curing agent having been prepared were mixed at a volume ratio of 1:1, and the mixture was applied through a spray gun onto a wall from left to right so as to give a length of 30 cm in a horizontal direction and confirmed for a degree of liquid drip. One having a low preventing effect on liquid drip was not able to defy gravity and dripped downward, but one having a high preventing effect on liquid drip was able to be kept in an applied state without dripping.

Measurement of Concentrations of Metal Impurities 2 g of silicone oil-treated fumed silica was weighed out and loaded in a platinum container, and 10 ml of concentrated nitric acid and 10 ml of hydrofluoric acid were added thereto. The content was heated with a hot plate at 200° C. to evaporate a liquid. After that, 2 ml of concentrated nitric acid was further added thereto, and the content was heated at 200° C. for 3 minutes and then cooled. The resultant was diluted to 25 ml with ultrapure water to be used as a sample. The sample was measured for concentrations of metal impurities with an ICP optical emission spectrometer (model 715-ES Radial manufactured by Varian Inc.).

Example 1

Synthesis of Fumed Silica

A sealed triple-port burner having an inner diameter of a center pipe of 100 mm was placed in a sealed reactor, and a mixed gas obtained by preliminarily mixing silicon tetrachloride (STC) serving as a raw material gas, hydrogen serving as a raw material gas, and air serving as a combustion supporting gas was supplied to the center pipe. Hydrogen and air were supplied to a first circular pipe to form a pilot flame. Air was caused to flow through a second circular pipe to prevent fumed silica particles from adhering to the burner. A desired specific surface area is obtained by controlling the amount of the raw material gas and the amount of the combustion supporting gas to be loaded into the center pipe.

Treatment with Silicone Oil 400 g of the fumed silica was loaded in a mixer having a volume of 35 L, stirred, and heated to 260° C. at the same time as the atmosphere was replaced with a nitrogen atmosphere. 80 g (20 parts by mass with respect to 100 parts by mass of the fumed silica) of polydimethylsiloxane having a viscosity of 50 cSt serving as a silicone oil was sprayed on the fumed silica serving as a raw material. The resultant fumed silica was kept at 260° C. for 1 hour, and then the atmosphere in the container was replaced with air so as to achieve an oxygen concentration of 20.5 vol %. After that, the fumed silica was further kept at 260° C. for 1 hour to obtain silicone oil-treated fumed silica. The physical properties of the obtained silicone oil-treated fumed silica, and the fumed silica and the silicone oil used for the production thereof are shown in Table 1 and Table 2. The amounts of metal impurities in the obtained silicone oil-treated fumed silica are shown in Table 3.

Examples 2 to 4

The same method as in Example 1 was performed except that the viscosity of the silicone oil to be used and the specific surface area of the fumed silica were changed as shown in Table 1 in Example 1. The physical properties of the obtained silicone oil-treated fumed silica are shown in Table 1 and Table 2. The amounts of metal impurities are shown in Table 3.

Example 5

The same operation as in Example 1 was performed except that the atmosphere in the container was replaced so as to achieve an oxygen concentration of 15 vol % in Example 1. The physical properties of the obtained silicone oil-treated fumed silica and the like are shown in Table 1 and Table 2. The amounts of metal impurities are shown in Table 3.

Comparative Example 1

The same operation as in Example 1 was performed except that the replacement with air was not performed after the spraying of the silicone oil, and after the spraying, the resultant fumed silica was kept at 260° C. for 1 hour and then successively kept at 260° C. for 1 hour in the nitrogen atmosphere in Example 1. The physical properties of the obtained silicone oil-treated fumed silica and the like are shown in Table 1 and Table 2. The amounts of metal impurities are shown in Table 3.

Comparative Example 2

The same operation as in Comparative Example 1 was performed except that the amount of the silicone oil to be used for surface treatment was changed to 160 g (40 parts by mass with respect to 100 parts by mass of the fumed silica) in Comparative Example 1. The physical properties of the obtained silicone oil-treated fumed silica and the like are shown in Table 1 and Table 2. The amounts of metal impurities are shown in Table 3.

Comparative Example 3

The same operation as in Comparative Example 1 was performed except that the high temperature treatment in the nitrogen atmosphere, which was performed after the silicone oil was sprayed and the resultant fumed silica was then kept at 260° C. for 1 hour, was performed at 310° C. for 2 hours in Comparative Example 1. The physical properties of the obtained silicone oil-treated fumed silica and the like are shown in Table 1 and Table 2. The amounts of metal impurities are shown in Table 3.

Comparative Example 4

Silicone oil-treated fumed silica was obtained in the same manner as in Example 1 except that the specific surface area of the fumed silica was changed as shown in Table 1 in Example 1. The physical properties of the obtained silicone oil-treated fumed silica and the like are shown in Table 1 and Table 2. The amounts of metal impurities are shown in Table 3.

From Examples and Comparative Examples described above, it is revealed that, when the silicone oil-treated fumed silica is produced by subjecting the raw material silica to treatment with the silicone oil and then to heat treatment in the coexistence of oxygen, the degree of hydrophobicity is increased, the viscosity and TI of an amine-based composition are increased, and the storage stability of the amine-based composition also becomes excellent. From. Comparative Example 3, it is revealed that the heat treatment is significantly suitably performed in the presence of oxygen in order to obtain a thickening effect on the amine-based composition and thickening stability of the amine-based composition.

TABLE 1

|  | Fumed silica | | | Silicone oil | |
|---|---|---|---|---|---|
|  | Specific surface area [m$^2$/g] | Bulk density [g/L] | Viscosity [cSt] | Addition amount [parts by mass] | Treatment temperature [° C.] |
| Example 1 | 208 | 32 | 50 | 20 | 260 |
| Example 2 | 208 | 32 | 100 | 24 | 260 |
| Example 3 | 151 | 34 | 100 | 20 | 260 |
| Example 4 | 208 | 32 | 200 | 30 | 260 |
| Example 5 | 208 | 32 | 100 | 24 | 260 |
| Comparative Example 1 | 208 | 32 | 50 | 20 | 260 |
| Comparative Example 2 | 208 | 32 | 50 | 40 | 260 |
| Comparative Example 3 | 208 | 32 | 50 | 20 | 310 |
| Comparative Example 4 | 80 | 33 | 50 | 20 | 260 |

| | Silicone oil-treated fumed silica | | | | | |
|---|---|---|---|---|---|---|
|  | Specific surface area [m$^2$/g] | Total carbon amount [wt %] | Total carbon-equivalent amount of silicone oil [mg/m$^2$] | Amount of fixed silicone oil [mg/m$^2$] | Silicone oil fixation rate [%] | Degree of hydrophobicity [vol %] |
| Example 1 | 107 | 5.2 | 0.9 | 0.8 | 89 | 70 |
| Example 2 | 97 | 6.2 | 1.1 | 0.9 | 83 | 71 |
| Example 3 | 78 | 5.3 | 1.3 | 1.0 | 76 | 72 |
| Example 4 | 86 | 7.7 | 1.5 | 1.2 | 79 | 72 |
| Example 5 | 98 | 6.3 | 1.2 | 0.9 | 81 | 70 |
| Comparative Example 1 | 103 | 5.3 | 0.9 | 0.7 | 78 | 66 |
| Comparative Example 2 | 104 | 8.9 | 1.8 | 1.0 | 54 | 71 |
| Comparative Example 3 | 83 | 5.4 | 1.0 | 0.7 | 75 | 70 |
| Comparative Example 4 | 30 | 5.4 | 2.5 | 1.5 | 59 | 78 |

TABLE 2

|  | Viscosity | | | TI | | | Liquid drip test result |
|---|---|---|---|---|---|---|---|
|  | After 1 hr [mPa · s] | After 31 hr [mPa · s] | Residual rate [%] | After 1 hr [—] | After 31 hr [—] | Residual rate [%] |  |
| Example 1 | 4,150 | 3,140 | 76 | 4.8 | 2.3 | 48 | A |
| Example 2 | 5,060 | 4,010 | 79 | 5.5 | 2.8 | 51 | A |

TABLE 2-continued

|  | Viscosity | | | TI | | | Liquid drip test result |
|---|---|---|---|---|---|---|---|
|  | After 1 hr [mPa · s] | After 31 hr [mPa · s] | Residual rate [%] | After 1 hr [—] | After 31 hr [—] | Residual rate [%] |  |
| Example 3 | 4,600 | 3,510 | 76 | 5.5 | 2.8 | 51 | A |
| Example 4 | 6,180 | 4,560 | 74 | 5.4 | 2.7 | 50 | A |
| Example 5 | 4,930 | 3,820 | 77 | 5.2 | 2.7 | 52 | A |
| Comparative Example 1 | 3,710 | 1,890 | 51 | 4.5 | 1.6 | 36 | B |
| Comparative Example 2 | 3,790 | 1,860 | 49 | 4.6 | 1.5 | 33 | B |
| Comparative Example 3 | 3,820 | 1,520 | 40 | 4.6 | 1.3 | 28 | B |
| Comparative Example 4 | 2,510 | 1,900 | 76 | 4.3 | 2.2 | 51 | B |

*The times shown in the columns of viscosity and TI are each a time elapsed from the beginning of temperature retention of a measurement liquid at 25° C.
*Liquid drip test A: absence of liquid drip, B: presence of liquid

TABLE 3

|  | Concentration of metal impurity [ppm] | | | | | |
|---|---|---|---|---|---|---|
|  | Na | K | Ca | Mg | Fe | Al |
| Example 1 | 0.01 | 0.01 | 0.02 | 0.02 | 0.03 | 0.01 |
| Example 2 | 0.01 | 0.02 | 0.01 | 0.02 | 0.02 | 0.01 |
| Example 3 | 0.01 | 0.01 | 0.02 | 0.01 | 0.02 | 0.01 |
| Example 4 | 0.01 | 0.01 | 0.03 | 0.01 | 0.03 | 0.02 |
| Example 5 | 0.02 | 0.02 | 0.03 | 0.03 | 0.03 | 0.02 |
| Comparative Example 1 | 0.01 | 0.02 | 0.03 | 0.02 | 0.02 | 0.02 |
| Comparative Example 2 | 0.02 | 0.02 | 0.03 | 0.03 | 0.03 | 0.03 |
| Comparative Example 3 | 0.01 | 0.01 | 0.03 | 0.02 | 0.03 | 0.02 |
| Comparative Example 4 | 0.02 | 0.01 | 0.02 | 0.02 | 0.02 | 0.02 |

The present invention has provided the silicone oil-treated fumed silica that exhibits a more satisfactory thickening effect than the related art when used for a resin composition of an epoxy resin and an amine curing agent. The silicone oil-treated fumed silica having an excellent thickening effect is obtained by subjecting hydrophilic fumed silica to treatment with the silicone oil in the coexistence of oxygen.

The present invention includes the following contents.

The silicone oil-treated fumed silica of the present invention has a high degree of hydrophobicity and a high silicone oil fixation rate, and provides a satisfactory thickening effect on an amine compound and satisfactory thickening stability for the amine compound.

The silicone oil-treated fumed silica of the present invention is applicable to an amine curing agent to be used for a two-component epoxy-based adhesive, and has features of exhibiting a high viscosity, preventing liquid drip, and being handled easily. The fumed silica serving as a raw material contains significantly small amounts of metal impurities, and hence the silicone oil-treated fumed silica of the present invention is applied particularly to an epoxy resin adhesive for, for example, electronic material applications.

Accordingly, when the silicone oil-treated fumed silica of the present invention is mixed with an amine compound, a satisfactory thickening property and satisfactory thickening stability are obtained, and hence the silicone oil-treated fumed silica of the present invention can also be used for an amine composition for a two-component epoxy-based adhesive. The silicone oil-treated fumed silica of the present invention is easily produced at low cost.

A person skilled in the art should understand that Examples of the present invention described above are for illustrative purposes only and the present invention is not limited thereto.

The object of the present invention has been effectively achieved, and the functions and structural principle of the present invention have already been described in Examples. The embodiments of the present invention may be arbitrarily modified without departing from the principle. Accordingly, the present invention includes all modified embodiments based on the spirit of Claims and the scope disclosed in Claims.

The invention claimed is:

1. A silicone oil-treated fumed silica, which has the following physical properties:
   A) the silicone oil-treated fumed silica has a degree of hydrophobicity of 68 vol % or more;
   B) the silicone oil-treated fumed silica has a silicone oil fixation rate of from 60 mass % to 95 mass %; and
   C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPa·s or more after the composition is left to stand at 25° C. for 1 hour.

2. The silicone oil-treated fumed silica according to claim 1, wherein the silicone oil-treated fumed silica has a specific surface area of from 50 $m^2/g$ to 130 $m^2/g$.

3. The silicone oil-treated fumed silica according to claim 1, wherein the silicone oil-treated fumed silica has a total carbon amount of from 5 mass % to 8 mass %.

4. The silicone oil-treated fumed silica according to claim 1,
   wherein the silicone oil-treated fumed silica comprises Na, K, Ca, Mg, Fe, and Al as metal impurities, and
   wherein contents of the metal impurities are each 0.1 ppm or less.

5. The silicone oil-treated fumed silica according to claim 1, wherein the silicone oil-treated fumed silica further has the following physical property:
   D) a thixotropic index (TI) measured for a composition obtained by the same method as in the item C) is 4.8 or more after a temperature of the composition is retained at 25° C. for 1 hour.

6. The silicone oil-treated fumed silica according to claim 1, wherein the silicone oil-treated fumed silica further has the following physical property:

C') a viscosity residual rate represented by the following equation and calculated for a composition obtained by the same method as in the item C) is 70% or more.

Viscosity residual rate (%)=viscosity of the composition 31 hours after beginning of temperature retention at 25° C./viscosity of the composition 1 hour after beginning of temperature retention at 25° C.×100

7. The silicone oil-treated fumed silica according to claim 1, wherein the silicone oil-treated fumed silica further has the following physical property:
D') a TI residual rate represented by the following equation and calculated for a composition obtained by the same method as in the item C) is 45% or more.

TI residual rate (%)=TI of the composition 31 hours after beginning of temperature retention at 25° C./TI of the composition 1 hour after beginning of temperature retention at 25° C.×100

8. The silicone oil-treated fumed silica according to claim 1, wherein the silicone oil-treated fumed silica is used as an additive for preparing an amine-based composition containing an amine compound.

9. The silicone oil-treated fumed silica according to claim 8, wherein the amine-based composition is used as a curing agent for a two-component epoxy-based adhesive.

10. The silicone oil-treated fumed silica according to claim 1, wherein the silicone oil-treated fumed silica is used as a curing agent for preparing a two-component epoxy-based adhesive containing an amine compound.

11. The silicone oil-treated fumed silica according to claim 1, wherein the silicone oil-treated fumed silica is produced by a method of producing the silicone oil-treated fumed silica, comprising the step of:
causing a silicone oil to adhere to a surface of fumed silica under an inert gas atmosphere at from 150° C. to 300° C., followed by subjecting the fumed silica to high temperature treatment under an oxygen-containing gas atmosphere at from 150° C. to 300° C. to obtain the silicone oil-treated fumed silica.

12. A method of producing a silicone oil-treated fumed silica, comprising the step of:
causing a silicone oil to adhere to a surface of fumed silica under an inert gas atmosphere at from 150° C. to 300° C., followed by subjecting the fumed silica to high temperature treatment under an oxygen-containing gas atmosphere at from 150° C. to 300° C. to obtain the silicone oil-treated fumed silica,
wherein the silicone oil-treated fumed silica which has the following physical properties:
A) the silicone oil-treated fumed silica has a degree of hydrophobicity of 68 vol% or more;
B) the silicone oil-treated fumed silica has a silicone oil fixation rate of from 60 mass% to 95 mass%; and
C) a composition obtained by adding 6 parts by mass of the silicone oil-treated fumed silica to 100 parts by mass of an amine composition containing trimethylolpropane polyoxypropylene triamine and 1,3-bis(aminomethyl)cyclohexane at a mass ratio of 95:5 has a viscosity of 4,000 mPas or more after the composition is left to stand at 25° C. for 1 hour.

13. The method according to claim 12, wherein the oxygen-containing gas has an oxygen concentration of 12 vol % or more.

* * * * *